July 20, 1943.  V. C. ROGERS ET AL  2,324,880

VALVE DIAPHRAGM

Filed Oct. 10, 1941

INVENTORS,
VIVIAN CEREDIG ROGERS AND
DAVID PURSS BARR,
BY Simon Broder
ATTORNEY.

Patented July 20, 1943

2,324,880

UNITED STATES PATENT OFFICE 2,324,880

VALVE DIAPHRAGM

Vivian Ceredig Rogers, Lower Pontnewydd, near Newport, and David Purss Barr, Pontnewydd, near Newport, England, assignors to Saunders Valve Company Limited, Cwmbran, England Application October 10, 1941, Serial No. 414,524
In Great Britain October 25, 1940

3 Claims. (Cl. 137—157)

This invention relates to diaphragm valves wherein the diaphragm is positively attached to a diaphragm actuator by a stud whose head is embedded in the diaphragm.

For normal use a diaphragm with reinforcement pierced by the shank of the stud so that the head is embedded on the side of that reinforcement remote from the diaphragm actuator is satisfactory.

It has been found in practice however that under severe conditions, for example when the valve is controlling a vacuum line or has been controlling a fluid which makes the material of the diaphragm semi-plastic and therefore liable to stick to the valve seating, the stud can be pulled away from the diaphragm. This can happen without the reinforcement tearing, but by the material around the hole through which the stud shank projects stretching sufficiently to allow the head of the stud to pass.

The object of this invention is to provide means whereby the stud is more securely attached to the diaphragm than hitherto.

This is achieved, according to the invention, by embedding a ring of greater diameter than that of the shank of the attachment stud within the diaphragm so as to surround the shank. This ring prevents any possibility of the material surrounding the stud shank stretching radially.

Usually such diaphragms are moulded with a boss integral with the diaphragm and the stud head is embedded in this boss. In a particularly advantageous form of construction according to the invention there are a plurality of reinforcing plies embedded in the boss and pierced by the stud shank and these plies are arranged so as to be on both sides of the ring.

A preferred embodiment of the invention is illustrated in the accompanying drawing in which.

Figure 1:
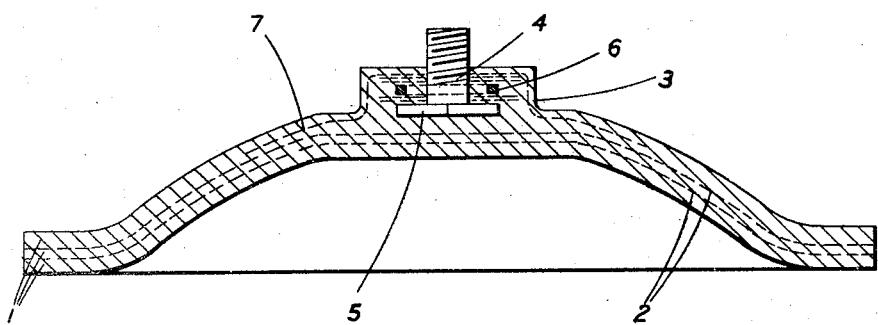
Fig. 1 is a section of the diaphragm through the stud.
Figure 2:
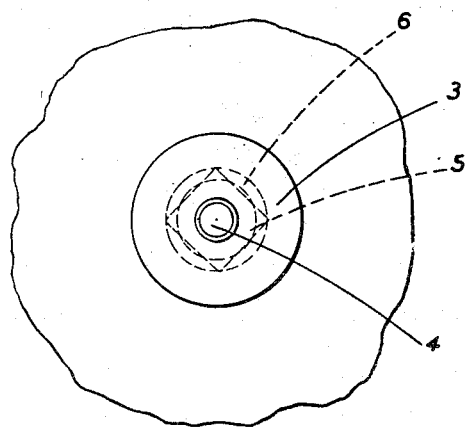
Fig. 2 is a fragmentary view of the diaphragm in plan.

From the drawing it will be observed that the diaphragm which is of moulded construction is built up of alternate layers of rubber sheet 1 and reinforcement 2 consisting of rubber impregnated fabric. The boss 3 is built up of alternate plies of thin rubber sheet and reinforcement there being five plies of reinforcement in all. These plies are, in the un-assembled state, pierced by the shank 4 of an attachment stud which has a square head 5. Interposed between the reinforcing layers is a metal ring 6. The internal diameter of the ring 6 is, as shown in the drawing, considerably greater than that of the shank 4, the external diameter of the ring being substantially the same as the diameter of a circle circumscribing the square head 5 of the stud.

The top reinforcement ply 7 is as shown of considerably greater diameter than that of the others. The diaphragm is as usual vulcanised in a mould and the boss and diaphragm proper thereby united into one integral article. By the moulding process the top reinforcement ply 7 thus forms an anchor running from the boss well into the main body of the diaphragm.

In small diaphragms the metal ring whose purpose is to prevent radial spread of the reinforcement on top of the stud head may with advantage be of greater diameter than that of a stud head of a size usually used in such diaphragms.

What we claim is:

1. A valve diaphragm, comprising an elastic diaphragm body, an attachment stud the head of which is embedded in the diaphragm body and the shank of which projects therefrom, and a metallic ring embedded in the diaphragm body and surrounding the shank of the stud, the inner diameter of the ring being greater than the outer diameter of the shank, whereby the diaphragm material surrounding the shank and within the ring is prevented from stretching radially.

2. A valve diaphragm, comprising an elastic diaphragm body, a boss integral therewith, a plurality of reinforcing plies within the boss, an attachment stud the head of which is embedded in the boss and a shank of which projects outwardly therefrom, and a metallic retaining ring embedded between the reinforcing plies in the boss and surrounding the shank of the stud, the inner diameter of the ring being greater than the outer diameter of the shank, whereby the diaphragm material surrounding the shank and within the ring is prevented from stretching radially.

3. The diaphragm set forth in claim 2, wherein the outermost section of the boss has the strongest reinforcing ply.

VIVIAN CEREDIG ROGERS.
DAVID PURSS BARR.